United States Patent
Inoue et al.

(10) Patent No.: US 10,239,557 B2
(45) Date of Patent: Mar. 26, 2019

(54) VEHICLE TRAVEL CONTROL DEVICE AND AUTONOMOUS DRIVING CONTROL METHOD

(71) Applicant: TOYOTA JIDOSHA KABUSHIKI KAISHA, Toyota-shi, Aichi-ken (JP)

(72) Inventors: Go Inoue, Gotemba (JP); Mitsutaka Tanimoto, Numazu (JP); Takahiro Yokota, Susono (JP); Yoshio Kudo, Tokyo (JP); Yutaka Aoki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/794,917

(22) Filed: Oct. 26, 2017

(65) Prior Publication Data
US 2018/0178838 A1  Jun. 28, 2018

(30) Foreign Application Priority Data
Dec. 26, 2016  (JP) ................. 2016-251301

(51) Int. Cl.
| | | |
|---|---|---|
| A01B 69/00 | (2006.01) | |
| B62D 6/00 | (2006.01) | |
| B62D 11/00 | (2006.01) | |
| B62D 12/00 | (2006.01) | |
| B63G 8/20 | (2006.01) | |
| B63H 25/04 | (2006.01) | |
| G05D 1/00 | (2006.01) | |
| G06F 7/00 | (2006.01) | |
| G06F 17/00 | (2019.01) | |
| G06F 19/00 | (2018.01) | |

(Continued)

(52) U.S. Cl.
CPC ......... *B62D 15/025* (2013.01); *B62D 5/0457* (2013.01); *B62D 6/00* (2013.01); *G05D 1/021* (2013.01)

(58) Field of Classification Search
CPC ...... B62D 15/025; B62D 5/0457; B62D 6/00; B62D 6/008; G05D 1/021; B60T 8/1755
USPC ................................... 701/41, 48
See application file for complete search history.

(56) References Cited

U.S. PATENT DOCUMENTS

| | | | |
|---|---|---|---|
| 2010/0211271 A1* | 8/2010 | Yasutake | B60T 8/1755 701/48 |
| 2012/0072074 A1* | 3/2012 | Greul | B62D 6/008 701/41 |
| 2014/0046542 A1 | 2/2014 | Kauffman et al. | |

FOREIGN PATENT DOCUMENTS

| | | |
|---|---|---|
| JP | 2002-46640 A | 2/2002 |
| JP | 2004-149060 A | 5/2004 |
| JP | 2008-189058 A | 8/2008 |

\* cited by examiner

*Primary Examiner* — Mahmoud S Ismail
(74) *Attorney, Agent, or Firm* — Oliff PLC (57) ABSTRACT

A vehicle travel control device includes: an EPS device turning a wheel of a vehicle; and a control device performing autonomous driving control that controls autonomous driving of the vehicle. The autonomous driving control includes: calculating a target steering angle of the wheel; and actuating the EPS device to turn the wheel such that a steering angle of the wheel becomes the target steering angle. Calculating the target steering angle includes: calculating an autonomous driving steering angle and a target state quantity required for automatic steering in the autonomous driving; calculating a counter steering angle required for vehicle stabilization control, based on the target state quantity without using a steering wheel angle; and calculating a sum (Continued)

of the autonomous driving steering angle and the counter steering angle as the target steering angle.

3 Claims, 8 Drawing Sheets

(51) Int. Cl.
    *B62D 15/02*         (2006.01)
    *B62D 5/04*          (2006.01)
    *G05D 1/02*          (2006.01)
    *B60R 22/00*        (2006.01)
    *E05F 15/00*        (2015.01)
    *G05D 3/00*         (2006.01)

Fig. 8

VEHICLE TRAVEL CONTROL DEVICE AND AUTONOMOUS DRIVING CONTROL METHOD

BACKGROUND

Technical Field

The present disclosure relates to an autonomous driving control technique using an electric power steering (EPS) device.

Background Art

Patent Literature 1 discloses a vehicle steering system provided with an automatic steering function. The steering system has an EPS device. During normal steering where a driver steers, the steering system controls the EPS device to generate an assist torque that assists the steering by the driver. On the other hand, during automatic steering, the steering system uses the EPS device to perform steering angle control such that a steering angle of a wheel becomes a target steering angle.

Patent Literature 2 discloses a steering assist device for a vehicle. When a driver has an intention of steering, the steering assist device performs vehicle stabilization control. On the other hand, when the driver has no intention of steering, the steering assist device performs lane keep control. In the lane keep control, the steering assist device performs steering angle control by the use of an EPS device.

LIST OF RELATED ART

Patent Literature 1: Japanese Laid-Open Patent Publication No. 2008-189058
Patent Literature 2: Japanese Laid-Open Patent Publication No. 2002-46640

SUMMARY

Vehicle stabilization control for stabilizing travel of a vehicle is known. As described in the above-mentioned Patent Literature 2, the conventional vehicle stabilization control is designed on assumption that the driver performs a steering operation. However, during autonomous driving, a driving entity changes from the driver to an autonomous driving system, and turning is performed by an EPS device. Therefore, it is not preferable to incorporate the conventional vehicle stabilization control as it is into the autonomous driving. It is desirable to change, in connection with the change in the driving entity, vehicle stabilization control to one suitable for the autonomous driving.

An object of the present disclosure is to provide an autonomous driving control technique into which vehicle stabilization control suitable for autonomous driving is incorporated.

In an aspect of the present disclosure, a vehicle travel control device is provided.

The vehicle travel control device includes:
    an electric power steering device turning a wheel of a vehicle; and
    a control device performing autonomous driving control that controls autonomous driving of the vehicle.
The autonomous driving control includes:
target steering angle calculation processing that calculates a target steering angle of the wheel; and
turning control that actuates the electric power steering device to turn the wheel such that a steering angle of the wheel becomes the target steering angle.
The target steering angle calculation processing includes:
    first processing that calculates an autonomous driving steering angle and a target state quantity required for automatic steering in the autonomous driving;
    second processing that calculates a counter steering angle required for vehicle stabilization control, based on the target state quantity without using a steering wheel angle; and
    third processing that calculates a sum of the autonomous driving steering angle and the counter steering angle as the target steering angle.

In another aspect of the present disclosure, an autonomous driving control method for controlling autonomous driving of a vehicle is provided.

The vehicle includes an electric power steering device turning a wheel of the vehicle,
The autonomous driving control method includes:
calculating a target steering angle of the wheel; and
actuating the electric power steering device to turn the wheel such that a steering angle of the wheel becomes the target steering angle.
The calculating the target steering angle includes:
calculating an autonomous driving steering angle and a target state quantity required for automatic steering in the autonomous driving;
calculating a counter steering angle required for vehicle stabilization control, based on the target state quantity without using a steering wheel angle; and
calculating a sum of the autonomous driving steering angle and the counter steering angle as the target steering angle.

According to the present disclosure, vehicle stabilization control suitable for the autonomous driving is incorporated into the autonomous driving control.

More specifically, during the autonomous driving, the steering wheel angle is not used for calculating the counter steering angle required for the vehicle stabilization control. The reason is that the driving entity during the autonomous driving is not the driver but the autonomous driving system. During the autonomous driving, the steering wheel angle does not necessarily reflect a target yaw rate of the vehicle. The target yaw rate of the vehicle is reflected in the target state quantity calculated by the autonomous driving system being the driving entity. Therefore, the counter steering angle is calculated based not on the steering wheel angle but on the target state quantity. As a result, it is possible to more accurately calculate the counter steering angle during the autonomous driving.

Moreover, during the autonomous driving, the electric power steering device turns the wheel. Here, the sum of the autonomous driving steering angle and the counter steering angle is used as the target steering angle of the wheel. As a result, the counter steering angle required for the vehicle stabilization control is reflected in the steering angle of the wheel. That is, the vehicle stabilization control is performed as expected.

DETAILED DESCRIPTION OF THE EMBODIMENTS

Embodiments of the present disclosure will be described below with reference to the attached drawings.

1. Configuration Example of Vehicle Travel Control Device

Figure 1:
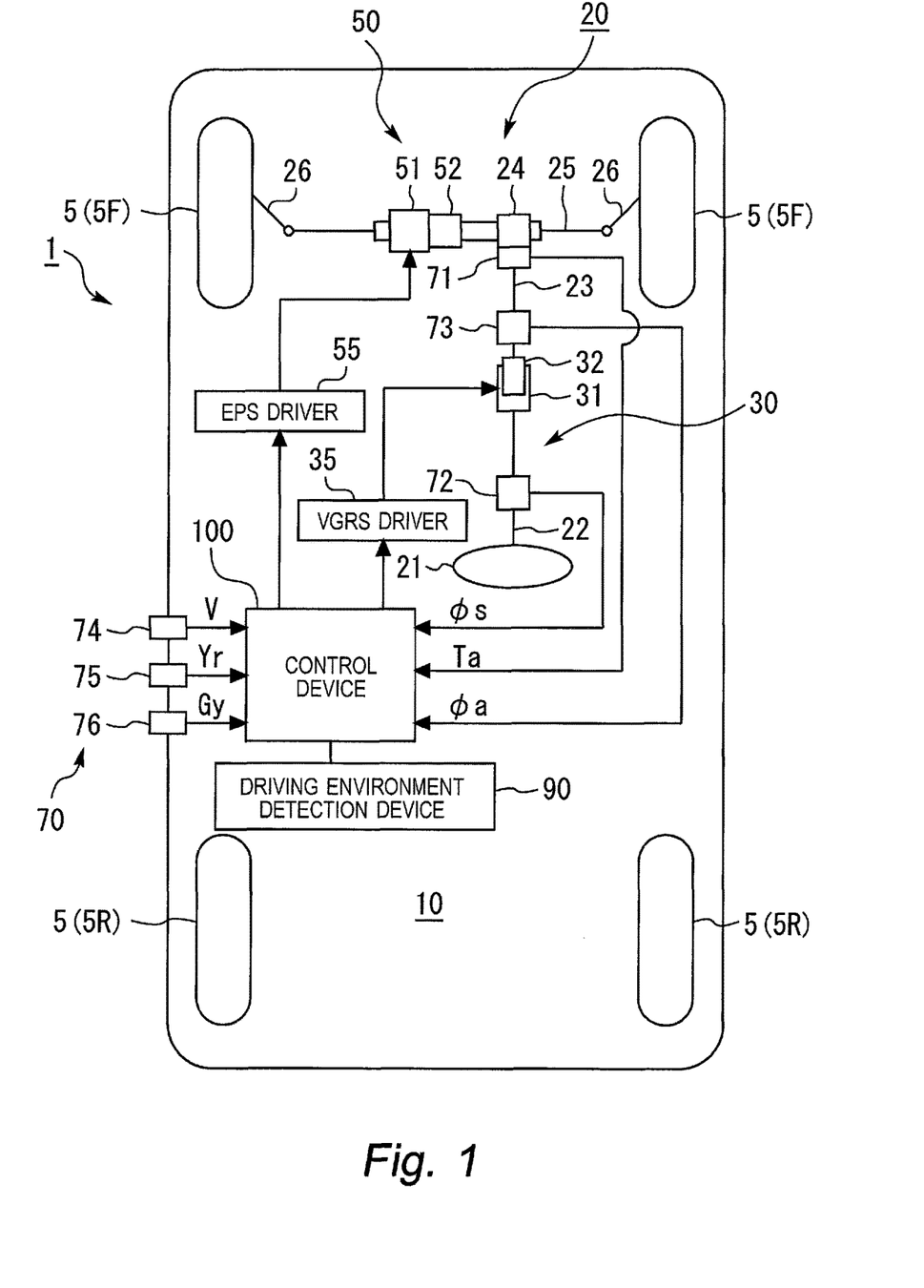
FIG. 1 is a schematic diagram showing a configuration example of a vehicle travel control device according to an embodiment of the present disclosure.

FIG. 1 is a schematic diagram showing a configuration example of a vehicle travel control device according to an embodiment of the present disclosure. The vehicle 1 has wheels 5 and a vehicle travel control device 10. The wheels 5 include a front wheel 5F and a rear wheel 5R. In the example shown in FIG. 1, a steering target is the front wheel 5F. It should be noted that the present embodiment can also be applied to a case of 4WS (4 Wheel Steering) where the steering target includes both the front wheel 5F and the rear wheel 5R.

The vehicle travel control device 10 controls travel of the vehicle 1. In the present embodiment, we focus particularly on turning control and autonomous driving control performed by the vehicle travel control device 10. As a configuration relating to the turning control and the autonomous driving control, the vehicle travel control device 10 is provided with a turning device 20, a sensor group 70, a driving environment detection device 90, and a control device 100.

1-1. Turning Device 20

The turning device 20 turns the front wheel 5F. More specifically, the turning device 20 includes a steering wheel 21, an upper steering shaft 22, a lower steering shaft 23, a pinion gear 24, a rack bar 25, a tie rod 26, a variable gear ratio steering device 30 (hereinafter referred to as a "VGRS (Variable Gear Ratio Steering) device"), and an electric power steering device 50 (hereinafter referred to as an "EPS (Electric Power Steering) device").

The steering wheel 21 is used for a steering operation by a driver. That is, the driver turns the steering wheel 21 when the driver wants to turn the front wheel 5F. The upper steering shaft 22 is connected to the steering wheel 21. One end of the lower steering shaft 23 is connected to the upper steering shaft 22 through the VGRS device 30, and the other end thereof is connected to the pinion gear 24. The pinion gear 24 engages with the rack bar 25. Both ends of the rack bar 25 are respectively connected to the left and right front wheels 5F through the tie rods 26. A rotation of the steering wheel 21 is transmitted to the pinion gear 24 through the upper steering shaft 22, the VGRS device 30, and the lower steering shaft 23. A rotational motion of the pinion gear 24 is converted into a linear motion of the rack bar 25, and thereby a steering angle of the front wheel 5F changes.

The VGRS device 30 is a device for changing a steering gear ratio. Here, the steering gear ratio is a ratio of a steering wheel angle (i.e. a steering angle of the steering wheel 21) and the steering angle of the front wheel 5F, and is proportional to a ratio of a rotation angle of the upper steering shaft 22 and a rotation angle of the lower steering shaft 23. For that purpose, the VGRS device 30 is so provided as to connect between the upper steering shaft 22 and the lower steering shaft 23.

More specifically, the VGRS device 30 includes an electric motor 31 and a VGRS driver 35. A housing of the electric motor 31 is fastened to one end of the upper steering shaft 22 and rotates together with the upper steering shaft 22. A stator of the electric motor 31 is fixed within the housing. On the other hand, a rotor 32 of the electric motor 31 is connected to the lower steering shaft 23 through a speed reducer. By the rotation of the electric motor 31, a relative rotation angle between the upper steering shaft 22 and the lower steering shaft 23 changes, that is, the steering gear ratio changes.

The VGRS driver 35 is a device for driving the electric motor 31, and includes an inverter and so forth. The inverter converts DC power supplied from a DC power source (not shown) to AC power and supplies the AC power to the electric motor 31 to drive the electric motor 31. By controlling the rotation of the electric motor 31, it is possible to variably control the steering gear ratio. An operation of the VGRS driver 35, that is, an operation of the VGRS device 30 is controlled by the control device 100. Details of the control of the VGRS device 30 by the control device 100 will be described later.

The EPS device 50 is a device for generating a power to turn the front wheel 5F. More specifically, the EPS device 50 includes an electric motor 51 and an EPS driver 55. For example, the electric motor 51 is connected to the rack bar 25 through a conversion mechanism 52. The conversion mechanism 52 is a ball screw, for example. When a rotor of the electric motor 51 rotates, the conversion mechanism 52 converts the rotational motion into a linear motion of the rack bar 25, and thereby the steering angle of the front wheel 5F changes.

The EPS driver 55 is a device for driving the electric motor 51, and includes an inverter and so forth. The inverter converts DC power supplied from a DC power source (not shown) to AC power and supplies the AC power to the electric motor 51 to drive the electric motor 51. By controlling the rotation of the electric motor 51, it is possible to turn the front wheel 5F. An operation of the EPS driver 55, that is, an operation of the EPS device 50 is controlled by the control device 100. Details of the control of the EPS device 50 by the control device 100 will be described later.

1-2. Sensor Group 70

The sensor group 70 is provided for detecting a variety of state quantities of the vehicle 1. For example, the sensor group 70 includes a torque sensor 71, a steering wheel angle sensor 72, a rotation angle sensor 73, a vehicle speed sensor 74, a yaw rate sensor 75, and a lateral acceleration sensor 76.

The torque sensor 71 detects a steering torque Ta applied to the lower steering shaft 23. The torque sensor 71 outputs detected information indicating the detected steering torque Ta to the control device 100.

The steering wheel angle sensor 72 detects the rotation angle of the upper steering shaft 22, that is, the steering wheel angle φs (i.e. the steering angle of the steering wheel 21). The steering wheel angle sensor 72 outputs detected information indicating the detected steering wheel angle φs to the control device 100.

The rotation angle sensor 73 detects the rotation angle φa of the lower steering shaft 23. The rotation angle φa corresponds to an actual steering angle of the front wheel 5F. The rotation angle sensor 73 outputs detected information indicating the detected rotation angle φa to the control device 100.

The vehicle speed sensor 74 detects a vehicle speed V that is a speed of the vehicle 1. The vehicle speed sensor 74 outputs detected information indicating the detected vehicle speed V to the control device 100.

The yaw rate sensor 75 detects an actual yaw rate Yr of the vehicle 1. The yaw rate sensor 75 outputs detected information indicating the detected actual yaw rate Yr to the control device 100.

The lateral acceleration sensor 76 detects an actual lateral acceleration Gy acting on the vehicle 1. The lateral acceleration sensor 76 outputs detected information indicating the detected actual lateral acceleration Gy to the control device 100.

1-3. Driving Environment Detection Device 90

The driving environment detection device 90 acquires "driving environment information" used for the autonomous driving control of the vehicle 1. The driving environment information is exemplified by position-orientation information, lane information, surrounding target information, infrastructure provided information, and so forth. In order to acquire such the driving environment information, the driving environment detection device 90 includes a GPS (Global Positioning System) device, a map database, a sensor, and a communication device, for example.

The GPS device receives signals transmitted from a plurality of GPS satellites and calculates a position and a posture (i.e. orientation) of the vehicle 1 based on the received signals. The GPS device sends the calculated position-orientation information to the control device 100.

Lane information indicating a geometry of each lane on a map is recorded in the map database. Based on the map database and a position of the vehicle 1, it is possible to acquire the lane information around the vehicle 1.

The sensor detects surrounding target information regarding a target around the vehicle 1. The sensor is exemplified by a LIDAR (Laser Imaging Detection and Ranging), a millimeter-wave radar, a stereo camera, and so forth. The LIDAR uses laser lights to detect a target around the vehicle 1. The millimeter-wave radar uses radio waves to detect a target around the vehicle 1. The stereo camera images a situation around the vehicle 1. The surrounding target includes a moving target and a stationary target. The moving target is exemplified by a surrounding vehicle and a pedestrian. Information of the moving target includes a position and a speed of the moving target. The stationary target is exemplified by a roadside structure and a white line. Information of the stationary target includes a position of the stationary target. The sensor sends the detected surrounding target information to the control device 100.

The communication device acquires infrastructure provided information from a information provision system. The infrastructure provided information is exemplified by traffic information, roadwork section information, and so forth. The communication device sends such the infrastructure provided information to the control device 100.

1-4. Control Device 100

The control device 100 controls the vehicle travel control device 10 according to the present embodiment. Typically, the control device 100 is a microcomputer including a processor, a memory, and an input/output interface. The control device 100 is also called an ECU (Electronic Control Unit). The control device 100 receives the detected information from the sensor group 70 and the driving environment information from the driving environment detection device 90, through the input/output interface. Based on the detected information and the driving environment information, the control device 100 performs the turning control and the autonomous driving control.

Figure 2:
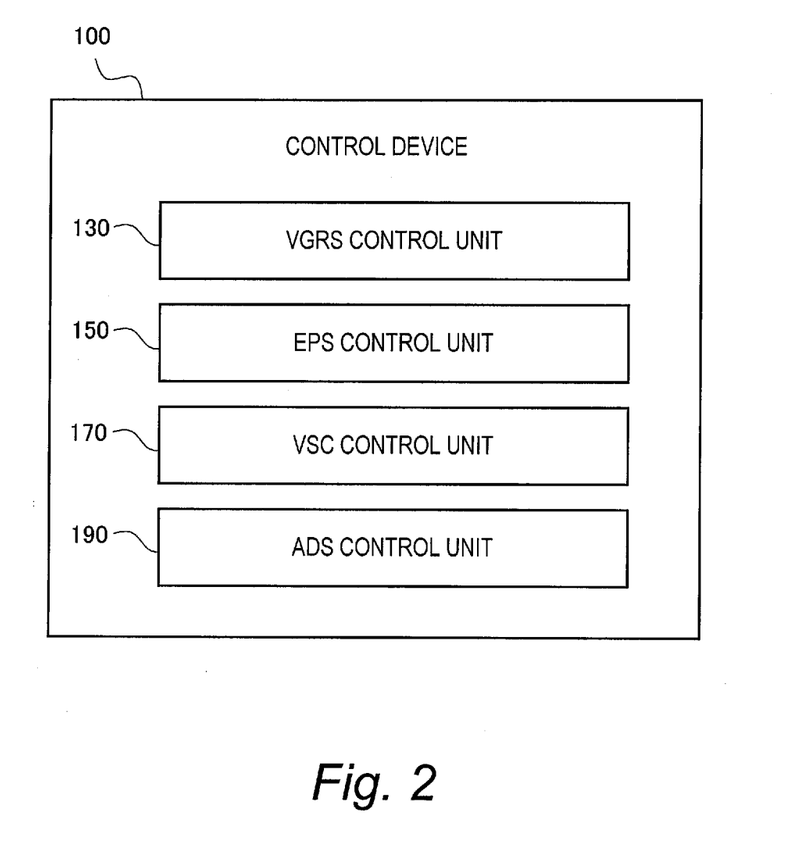
FIG. 2 is a block diagram showing a functional configuration of a control device according to the embodiment of the present disclosure.

FIG. 2 is a block diagram showing a functional configuration of the control device 100 according to the present embodiment. The control device 100 includes a VGRS control unit 130, an EPS control unit 150, a VSC (Vehicle Stability Control) control unit 170, and an ADS (Autonomous Driving System) control unit 190, as functional blocks relating to the turning control and the autonomous driving control. These functional blocks are achieved by the processor of the control device 100 executing a control program stored in the memory. The control program may be recorded on a computer-readable recording medium.

The VGRS control unit 130 controls the operation of the VGRS device 30 (i.e. the VGRS driver 35). The EPS control unit 150 controls the operation of the EPS device 50 (i.e. the EPS driver 55). The VSC control unit 170 performs vehicle stabilization control for stabilizing travel of the vehicle 1. The ADS control unit 190 performs the autonomous driving control that controls autonomous driving of the vehicle 1.

Hereinafter, control processing by the control device 100 in each of cases of non-autonomous driving and autonomous driving will be described in detail.

2. Control Processing During Non-Autonomous Driving

Figure 3:
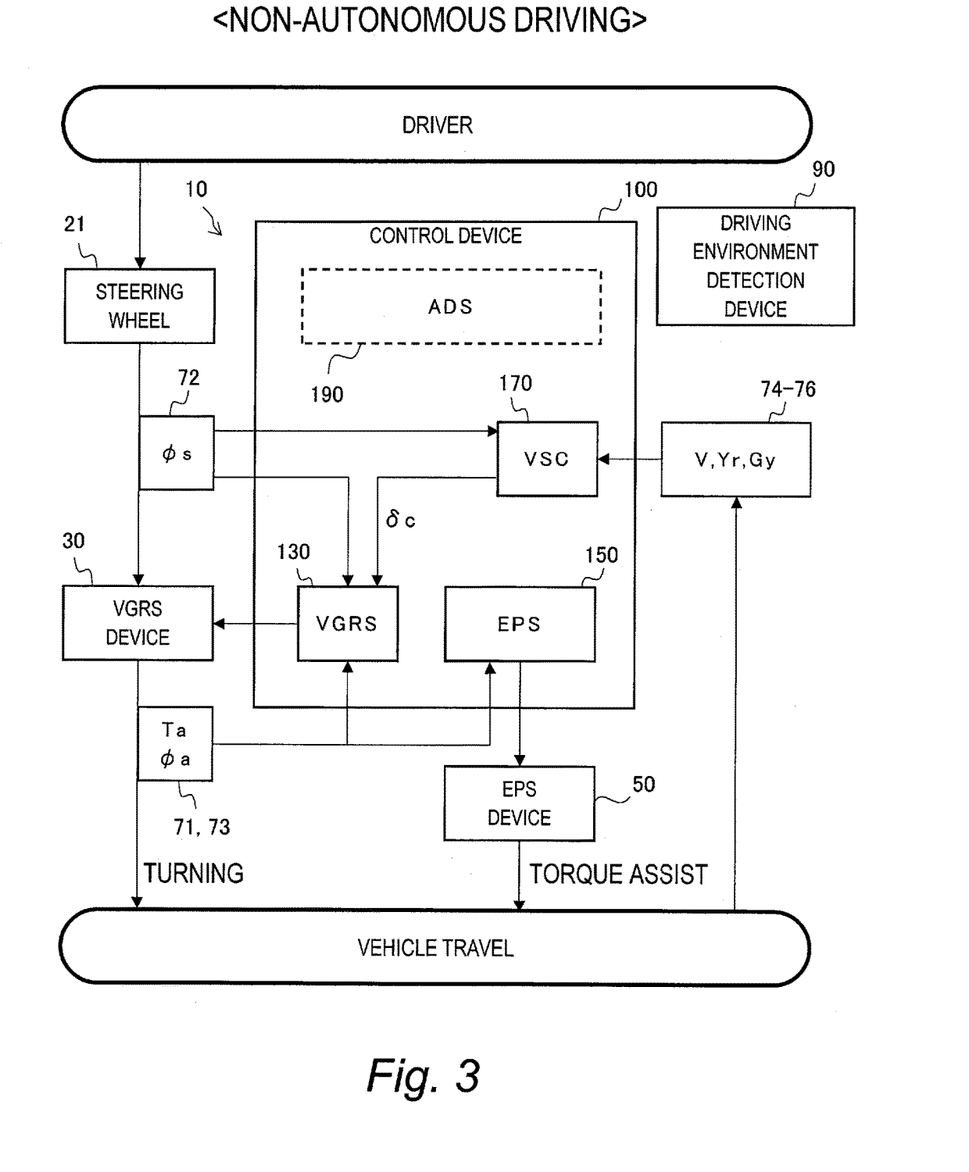
FIG. 3 is a conceptual diagram showing control processing during non-autonomous driving according to the embodiment of the present disclosure.

FIG. 3 is a conceptual diagram showing control processing during non-autonomous driving according to the present embodiment. During the non-autonomous driving, a driving entity is the driver, and the driver operates the steering wheel 21. That is, the steering wheel angle φs is determined by the driver's operation.

<VSC Control Unit 170>

The VSC control unit 170 performs the vehicle stabilization control for stabilizing travel of the vehicle 1. More specifically, the VSC control unit 170 receives the detected information of the steering wheel angle φs, the vehicle speed V, the actual yaw rate Yr, the actual lateral acceleration Gy, and the like from the sensor group 70. Based on the detected information, the VSC control unit 170 detects an unstable behavior such as skidding, understeer, oversteer, and so forth.

For example, the VSC control unit 170 calculates a target yaw rate based on the steering wheel angle φs and the vehicle speed V, by a publicly known method. Then, the VSC control unit 170 calculates a yaw rate deviation that is a difference between the actual yaw rate Yr and the target yaw rate. By comparing the yaw rate deviation with a threshold value, the VSC control unit 170 can detect oversteer or understeer.

In order to stabilize the vehicle travel, it is necessary to generate a counter yaw moment that can cancel out the unstable behavior. Such the counter yaw moment can be realized by a difference in braking force between the left and right wheels 5, turning of the wheel 5, and the like. In the present embodiment, we only consider the counter yaw moment generated by turning of the front wheel 5F. The VSC control unit 170 calculates a target change amount of the steering angle of the front wheel 5F that is required for generating the counter yaw moment. Such the target change amount of the steering angle is hereinafter referred to as a "counter steering angle δc". That is, the VSC control unit 170 calculates the counter steering angle δc required for the vehicle stabilization control.

<VGRS Control Unit 130>

The VGRS control unit 130 performs "turning control (steering angle control)" by the use of the VGRS device 30. More specifically, the VGRS control unit 130 receives the detected information of the steering wheel angle φs and the rotation angle φa from the steering wheel angle sensor 72 and the rotation angle sensor 73, respectively. In addition, the VGRS control unit 130 calculates a target rotation angle or a target relative rotation angle. The target rotation angle is a target value of the rotation angle φa. The target relative rotation angle is a target value of a difference between the steering wheel angle φs and the rotation angle φa.

For example, the VGRS control unit 130 receives information indicating the counter steering angle φc from the VSC control unit 170. In this case, the VGRS control unit 130 calculates the target relative rotation angle corresponding to the counter steering angle δc. Alternatively, the VGRS control unit 130 calculates a sum of the steering wheel angle δs and the target relative rotation angle as the target rotation angle.

As another example, the VGRS control unit 130 may calculate a target steering angle of the front wheel 5F for achieving desired vehicle dynamics characteristics. For example, the VGRS control unit 130 has a steering angle map indicating a relationship between an input parameter and the target steering angle. The input parameter includes the steering wheel angle φs and a steering wheel angular velocity dφs/dt, for example. The input parameter may further include the vehicle speed V detected by the vehicle speed sensor 74. The steering angle map is determined in advance in consideration of the desired vehicle dynamics characteristics. In response to an operation of the steering wheel 21 by the driver, the VGRS control unit 130 refers to the steering angle map to calculate the target steering angle according to the input parameter. Then, the VGRS control unit 130 calculates the target rotation angle or the target relative rotation angle from the target steering angle.

In either case, the VGRS control unit 130 performs feedback control of the VGRS driver 35 based on the detected information such that the target rotation angle or the target relative rotation angle is obtained. The VGRS driver 35 drives (actuates) the electric motor 31 in accordance with a control signal from the VGRS control unit 130. As a result, the steering angle of the front wheel 5F is controlled to be a value corresponding to the target rotation angle or the target relative rotation angle.

<EPS Control Unit 150>

The EPS control unit 150 performs "torque assist control" by the use of the EPS device 50. More specifically, the EPS control unit 150 receives the detected information of the steering torque Ta from the torque sensor 71. The EPS control unit 150 calculates an assist torque based on the steering torque Ta, and controls the EPS driver 55 such that the assist torque is obtained.

For example, the EPS control unit 150 has a torque map indicating a relationship between an input parameter and the assist torque. The input parameter includes the steering torque Ta detected by the torque sensor 71. The input parameter may further include the vehicle speed V detected by the vehicle speed sensor 74. The torque map is determined in advance in consideration of desired assist characteristics. In response to an operation of the steering wheel 21 by the driver, the EPS control unit 150 refers to the torque map to calculate the assist torque according to the input parameter.

Then, the EPS control unit 150 calculates a target current command according to the assist torque and outputs the target current command to the EPS driver 55. The EPS driver 55 drives (actuates) the electric motor 51 in accordance with the target current command. A rotational torque (i.e. the assist torque) of the electric motor 51 is transmitted to the rack bar 25 through the conversion mechanism 52. As a result, turning of the front wheel 5F is assisted and thus the driver's steering load is reduced.

3. Control Processing During Autonomous Driving 3-1. Present Embodiment

Figure 4:
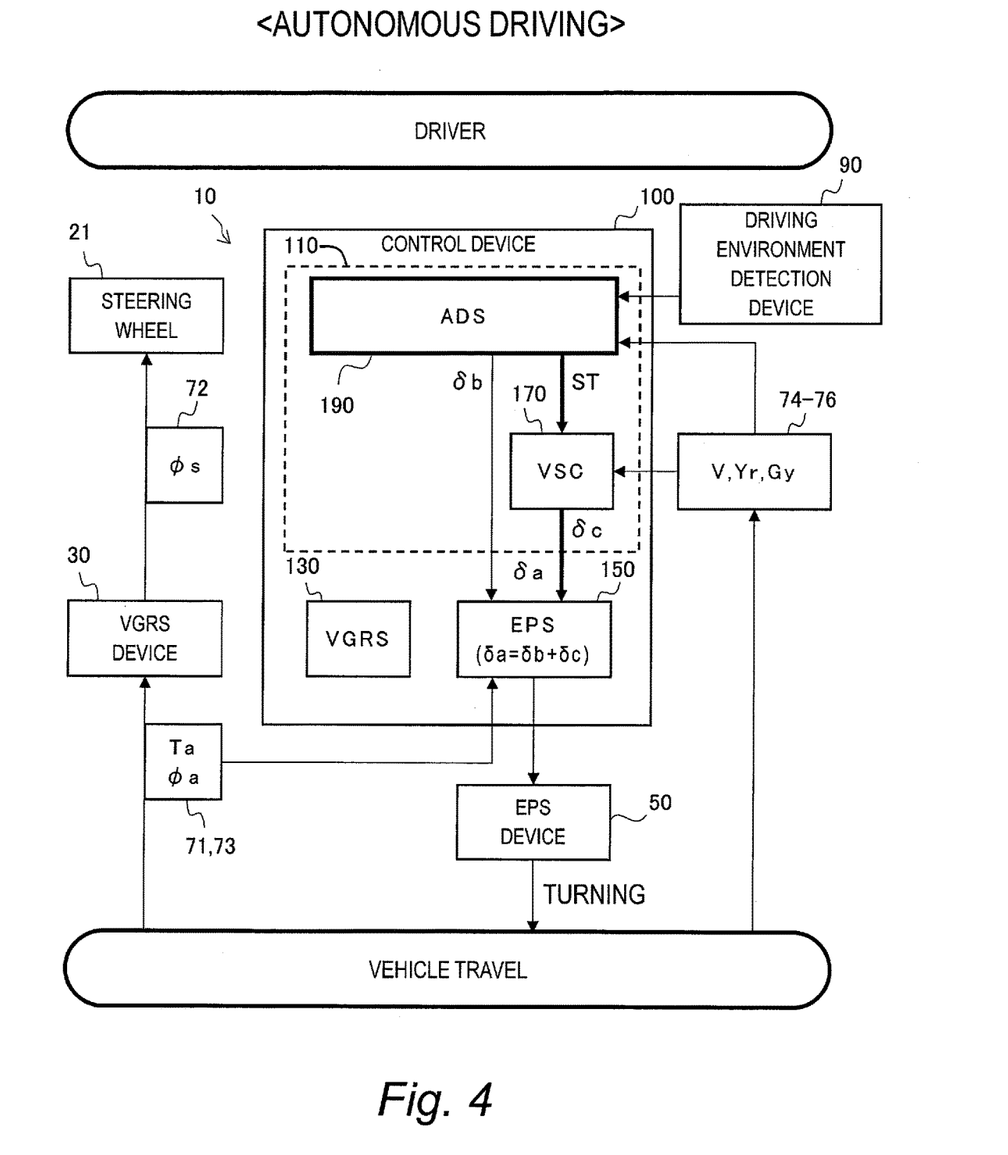
FIG. 4 is a conceptual diagram showing control processing during autonomous driving according to the embodiment of the present disclosure.

FIG. 4 is a conceptual diagram showing control processing during the autonomous driving according to the present embodiment. During the autonomous driving, the driving entity changes from the driver to an autonomous driving system (specifically, the ADS control unit 190).

<ADS Control Unit 190>

The ADS control unit 190 performs autonomous driving control that controls autonomous driving of the vehicle 1. The autonomous driving control includes automatic acceleration or deceleration and automatic steering. Here, we focus on the automatic steering in particular. The ADS control unit 190 calculates a target steering angle of the front wheel 5F required for the automatic steering. Such the target steering angle calculated by the ADS control unit 190 is hereinafter referred to as an "autonomous driving steering angle δb".

More specifically, the ADS control unit 190 receives the detected information of the vehicle speed V, the actual yaw rate Yr, the actual lateral acceleration Gy, and the like from the sensor group 70. In addition, the ADS control unit 190 receives the driving environment information from the driving environment detection device 90. Then, based on the detected information and the driving environment information, the ADS control unit 190 creates a travel plan of the vehicle 1. A typical example of the travel plan relating to the automatic steering is a lane change.

As an example, the ADS control unit 190 recognizes a lane merge section in front of the vehicle 1 based on the lane information included in the driving environment information. In this case, the ADS control unit 190 plans to make a lane change at the lane merge section.

As another example, the ADS control unit 190 recognizes an obstacle or a low-speed vehicle in front of the vehicle 1 based on the surrounding target information included in the driving environment information. In this case, the ADS control unit 190 plans to make a lane change in order to avoid the obstacle or the low-speed vehicle.

As still another example, the ADS control unit 190 recognizes a roadwork section in front of the vehicle 1 based on the infrastructure provided information included in the driving environment information. In this case, the ADS control unit 190 plans to make a lane change in order to avoid the roadwork section.

The ADS control unit 190 autonomously controls travel of the vehicle 1 according to the travel plan. In particular, when performing the automatic steering, the ADS control unit 190 calculates the autonomous driving steering angle δb required for the automatic steering. In addition, the ADS control unit 190 calculates a target state quantity ST of the vehicle 1 required for the automatic steering. The target state quantity ST includes the autonomous driving steering angle δb, a target yaw rate, a target lateral acceleration, and the like.

According to the present embodiment, the ADS control unit 190 outputs information on the target state quantity ST to the VSC control unit 170.

<VSC Control Unit 170>

The VSC control unit 170 calculates the counter steering angle δc required for the vehicle stabilization control, as in the case of the non-autonomous driving described above. However, in the case of the autonomous driving, the VSC control unit 170 does not use the steering wheel angle φs detected by the steering wheel angle sensor 72 for calculating the counter steering angle δc.

Instead, the VSC control unit 170 receives the information on the target state quantity ST from the ADS control unit 190. Then, the VSC control unit 170 calculates the counter steering angle δc based on the target state quantity ST. For example, the VSC control unit 170 calculates the target yaw rate by using the autonomous driving steering angle δb instead of the steering wheel angle φs. As another example, the VSC control unit 170 may use the target yaw rate included in the target state quantity ST as it is. Then, the VSC control unit 170 calculates a yaw rate deviation that is a difference between the actual yaw rate Yr and the target yaw rate. Moreover, the VSC control unit 170 calculates the counter steering angle δc required for generating the counter yaw moment from the yaw rate deviation.

<Target Steering Angle Calculation Unit 110>

In the present embodiment, a target steering angle δa of the front wheel 5F is a sum of the autonomous driving steering angle δb and the counter steering angle δc (i.e. δa=δb+δc). That is, the ADS control unit 190 and the VSC control unit 170 constitute a "target steering angle calculation unit 110" that calculates the target steering angle δa during the autonomous driving. In other words, the target steering angle calculation unit 110 calculates the autonomous driving steering angle δb required for the automatic steering and the counter steering angle δc required for the vehicle stabilization control. The target steering angle calculation unit 110 calculates the sum of the autonomous driving steering angle δb and the counter steering angle δc as the target steering angle δa.

The target steering angle calculation unit 110 outputs information indicating the calculated target steering angle δa to the EPS control unit 150. Then, the target steering angle calculation unit 110 instructs the EPS control unit 150 to perform turning control that turns the front wheel 5F.

Alternatively, the target steering angle calculation unit 110 may output information indicating both the autonomous driving steering angle δb and the counter steering angle δc to the EPS control unit 150. In this case, the EPS control unit 150 calculates the sum of the autonomous driving steering angle δb and the counter steering angle δc as the target steering angle δa.

<EPS Control Unit 150>

The EPS control unit 150 performs "turning control (steering angle control)" by the use of the EPS device 50. That is, the EPS device 50, which is used for the "torque assist control" during the non-autonomous driving, is used for the "turning control" during the autonomous driving.

More specifically, the EPS control unit 150 receives the information indicating the target steering angle δa of the front wheel 5F from the target steering angle calculation unit 110. In addition, the EPS control unit 150 receives the detected information of the rotation angle φa from the rotation angle sensor 73. The rotation angle φa corresponds to an actual steering angle of the front wheel 5F. Therefore, based on the rotation angle φa and the target steering angle δa, the EPS control unit 150 can perform feedback control of the EPS driver 55 such that the steering angle of the front wheel 5F becomes the target steering angle δa. The EPS driver 55 drives (actuates) the electric motor 51 in accordance with a control signal from the EPS control unit 150. As a result, the steering angle of the front wheel 5F is controlled to be the target steering angle δa.

In this manner, during the autonomous driving, the EPS control unit 150 actuates the EPS device 50 to turn the front wheel 5F. The role of the EPS device 50 changes from "torque assist" to "turning" in connection with the change in the driving entity from the driver to the autonomous driving system.

Hereinafter, some comparative examples will be described in order to explain effects of the present embodiment.

3-2. First Comparative Example

Figure 5:
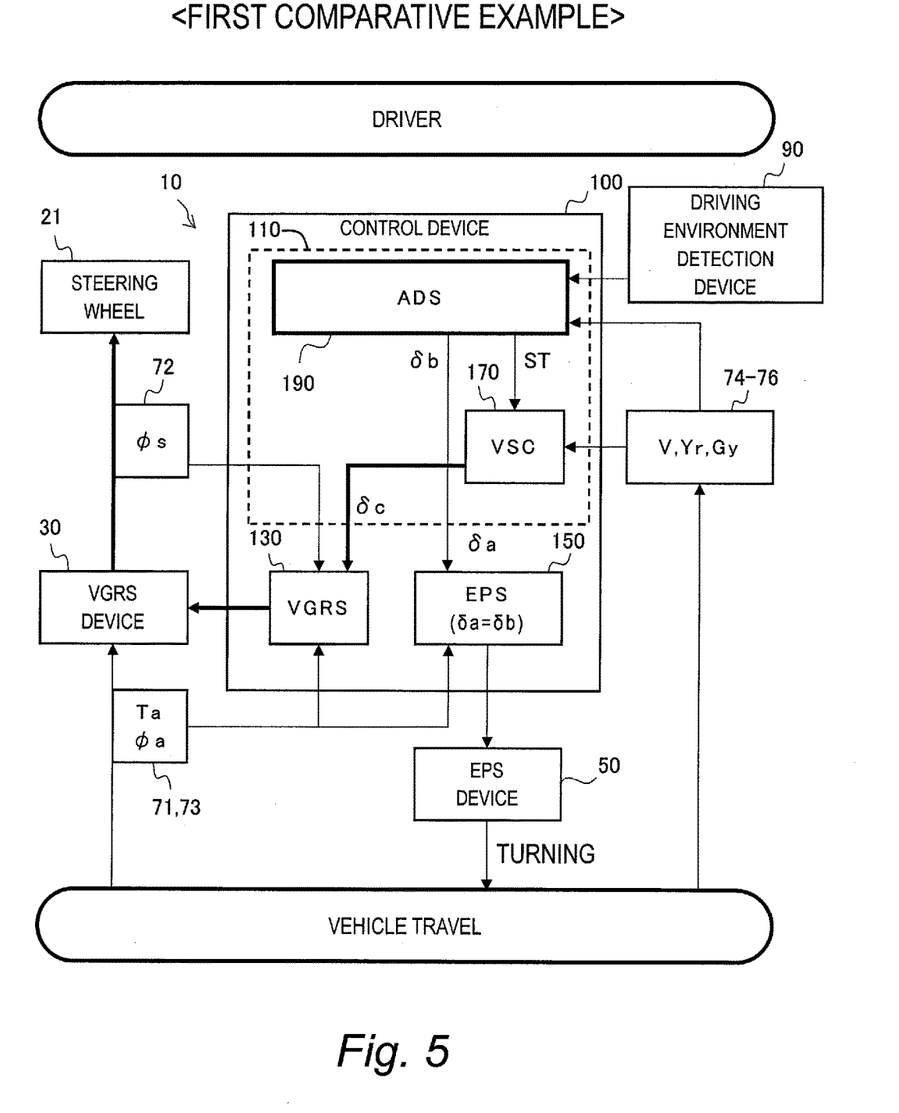
FIG. 5 is a conceptual diagram showing control processing during autonomous driving according to a first comparative example.

FIG. 5 is a conceptual diagram showing control processing during the autonomous driving according to a first comparative example. In the first comparative example, the target steering angle δa is not the sum of the autonomous driving steering angle δb and the counter steering angle δc but the autonomous driving steering angle δb (i.e. δa=δb). The vehicle stabilization control based on the counter steering angle δc is performed by the use of the VGRS device 30, as in the case of the non-autonomous driving (see FIG. 3).

<Target Steering Angle Calculation Unit 110, ADS Control Unit 190, VSC Control Unit 170>

The ADS control unit 190 calculates the autonomous driving steering angle δb required for the automatic steering. In the first comparative example, the autonomous driving steering angle δb is used as the target steering angle δa. The ADS control unit 190 outputs information indicating the calculated autonomous driving steering angle δb to the EPS control unit 150.

The VSC control unit 170 calculates the counter steering angle δc required for the vehicle stabilization control. The VSC control unit 170 outputs information indicating the calculated counter steering angle δc not to the EPS control unit 150 but to the VGRS control unit 130.

<EPS Control Unit 150>

The EPS control unit 150 receives the information indicating the target steering angle δa (=δb) of the front wheel 5F from the ADS control unit 190. Then, the EPS control unit 150 uses the EPS device 50 to perform the turning control based on the target steering angle δa.

<VGRS Control Unit 130>

The VGRS control unit 130 receives the information indicating the counter steering angle δc from the VSC control unit 170, as in the case of the non-autonomous driving described above (see FIG. 3). Then, the VGRS control unit 130 actuates the electric motor 31 of the VGRS device 30 by an angle corresponding to the counter steering angle δc.

However, during the autonomous driving, not the driver but the EPS device 50 turns the front wheel 5F. When the EPS device 50 turns the front wheel 5F, the steering wheel 21 connected to the front wheel 5F also rotates in conjunction with the turning of the front wheel 5F. In this case, even when the VGRS device 30 operates, the steering angle of the front wheel 5F does not change, but merely a rotation angle of the steering wheel 21 changes. In other words, the counter steering angle δc required for the vehicle stabilization control is not reflected in the steering angle of the front wheel 5F but in the steering wheel angle φs instead. This means that the vehicle stabilization control is not performed as expected, which is not preferable.

On the other hand, according to the present embodiment, the vehicle stabilization control during the autonomous driving is performed by the use of the EPS device 50 instead of the VGRS device 30. More specifically, in the turning control performed by the EPS control unit 150, the sum of the autonomous driving steering angle δb and the counter steering angle δc is used as the target steering angle δa (i.e. δa=δb+δc). As a result, the counter steering angle δc required for the vehicle stabilization control is reflected in the steering angle of the front wheel 5F. That is, the vehicle stabilization control is performed as expected.

3-3. Second Comparative Example

Figure 6:
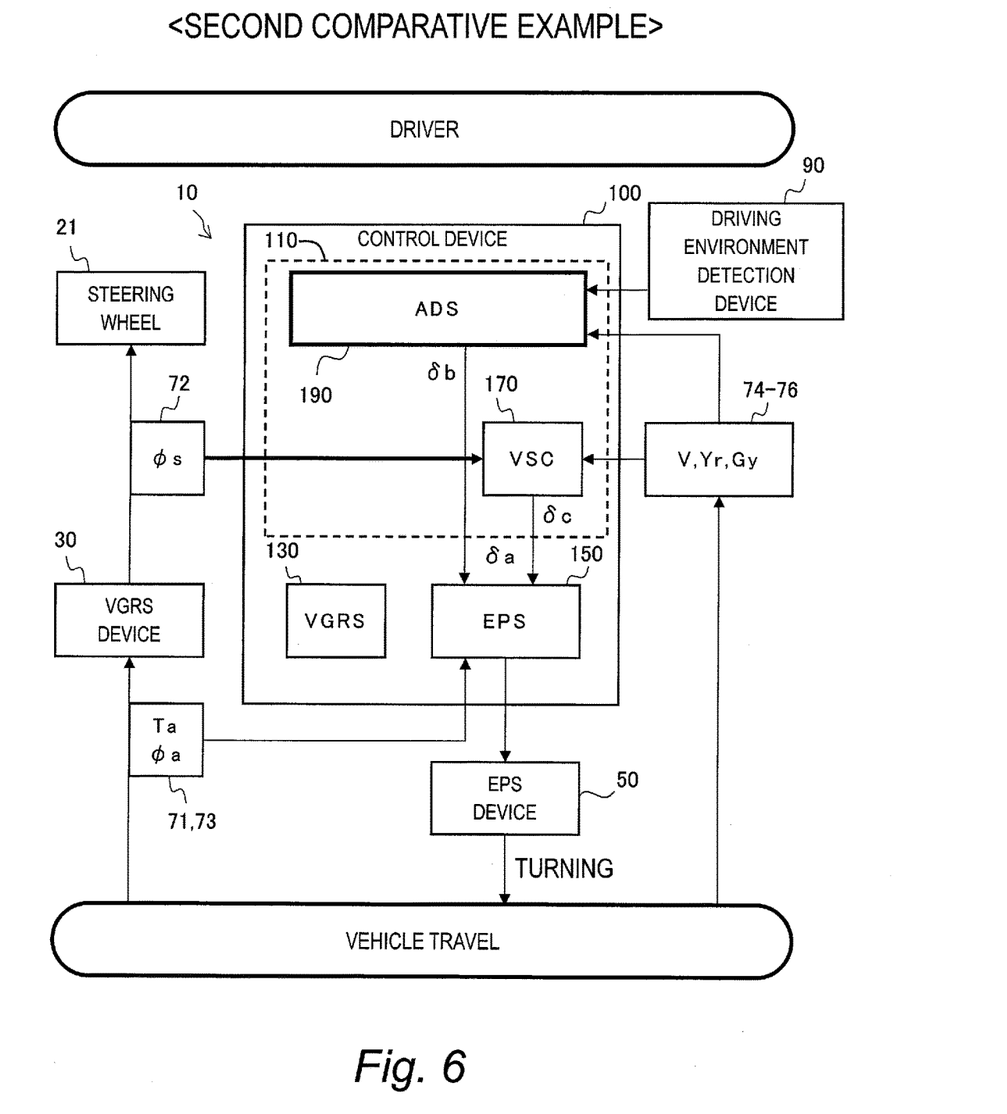
FIG. 6 is a conceptual diagram showing control processing during autonomous driving according to a second comparative example.

FIG. 6 is a conceptual diagram showing control processing during the autonomous driving according to a second comparative example. In the second comparative example, the VSC control unit 170 calculates the counter steering angle δc by using the steering wheel angle φs, as in the case of the non-autonomous driving (see FIG. 3).

However, the driving entity during the autonomous driving is not the driver but the autonomous driving system (the ADS control unit 190). The target yaw rate of the vehicle 1 is reflected in the autonomous driving steering angle δb and the target state quantity ST calculated by the ADS control unit 190 being the driving entity. On the other hand, the target yaw rate of the vehicle 1 is not necessarily reflected in the steering wheel angle φs. Therefore, calculating the counter steering angle δc by using the steering wheel angle φs is likely to cause a large error.

As an example, let us consider a case where the target steering angle δa during the autonomous driving is the sum of the autonomous driving steering angle δb and the counter steering angle δc (i.e. δa=δb+δc) as described above. When the EPS device 50 turns the front wheel 5F by the target steering angle δa, the steering wheel 21 connected to the front wheel 5F also rotates in conjunction with the turning of the front wheel 5F. Here, the change amount of the steering wheel angle φs corresponds to the target steering angle δa. However, the target steering angle δa is different from the autonomous driving steering angle δb and thus does not reflect the target yaw rate in the autonomous driving. Therefore, calculating the counter steering angle δc by using the steering wheel angle φs causes an error.

On the other hand, according to the present embodiment, the VSC control unit 170 does not use the steering wheel angle φs during the autonomous driving. As substitute for the steering wheel angle φs, the VSC control unit 170 receives the information on the target state quantity ST from the ADS control unit 190 being the driving entity. Then, the VSC control unit 170 calculates the counter steering angle δc based on the target state quantity ST. As a result, it is possible to more accurately calculate the counter steering angle δc during the autonomous driving.

3-4. Autonomous Driving Control Method

Figure 7:
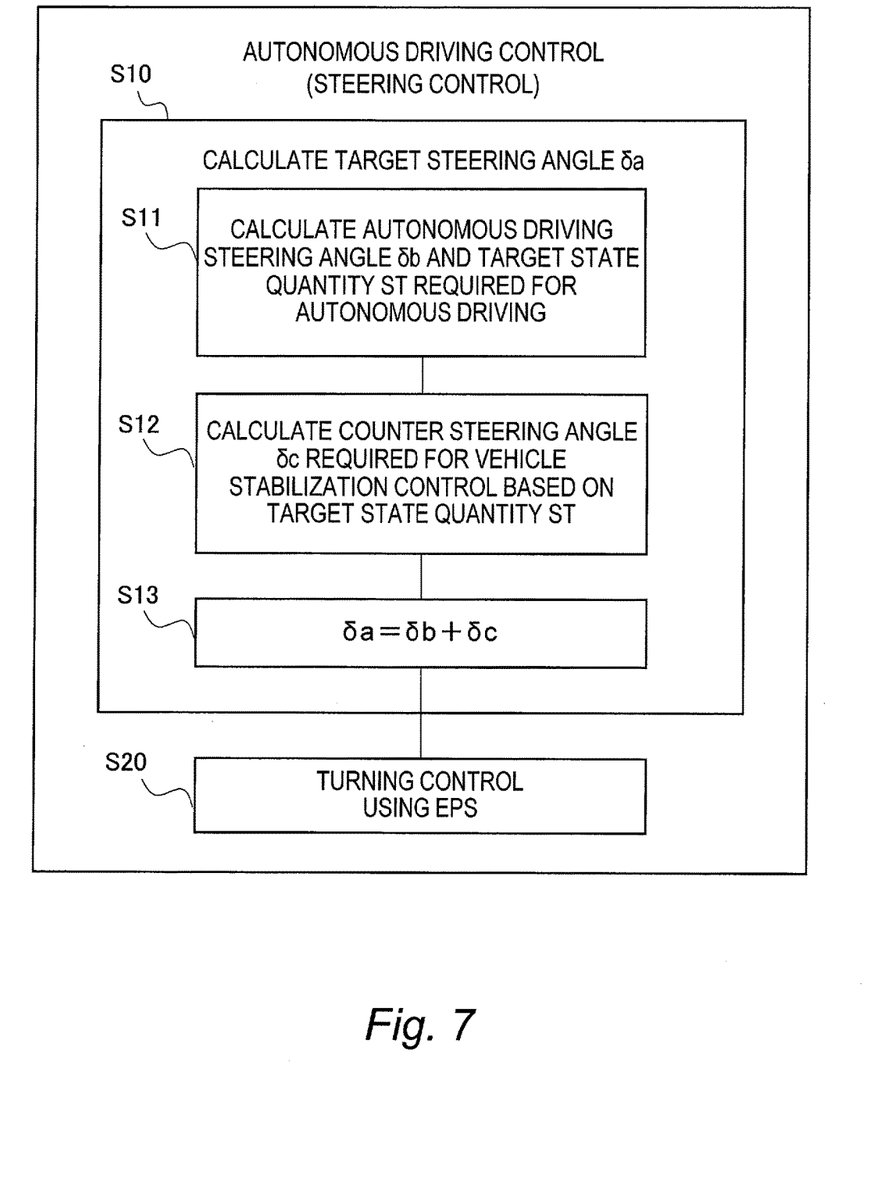
FIG. 7 is a flow chart showing in a summarized manner an autonomous driving control method according to the embodiment of the present disclosure.

FIG. 7 is a flow chart showing in a summarized manner an autonomous driving control method according to the present embodiment.

Step S10:

The control device 100 calculates the target steering angle δa of the front wheel 5F during the autonomous driving. More specifically, Step S10 includes Steps S11 to S13.

Step S11:

The control device 100 calculates the autonomous driving steering angle δb and the target state quantity ST required for the automatic steering in the autonomous driving.

Step S12:

The control device 100 calculates, based on the target state quantity ST, the counter steering angle δc required for the vehicle stabilization control. At this Step S12, the control device 100 does not use the steering wheel angle φs.

Step S13:

The control device 100 calculates the sum of the autonomous driving steering angle δb and the counter steering angle δc as the target steering angle δa.

Step S20:

The control device 100 uses the EPS device 50 to perform the turning control based on the target steering angle δa. More specifically, the control device 100 actuates the EPS device 50 such that the steering angle of the front wheel 5F becomes the target steering angle δa.

4. Effects

The conventional vehicle stabilization control is designed on assumption that the driver performs a steering operation. However, during the autonomous driving, the driving entity changes from the driver to the autonomous driving system, and turning is performed by the EPS device 50. It is desirable to change, in connection with the change in the driving entity, the vehicle stabilization control to one suitable for the autonomous driving. According to the present embodiment, the vehicle stabilization control suitable for the autonomous driving is incorporated into the autonomous driving control.

More specifically, during the autonomous driving, the VSC control unit 170 does not use the steering wheel angle φs for calculating the counter steering angle δc required for the vehicle stabilization control. The reason is that the driving entity during the autonomous driving is not the driver but the autonomous driving system (the ADS control unit 190). During the autonomous driving, the steering wheel angle φs does not necessarily reflect the target yaw rate of the vehicle 1. The target yaw rate of the vehicle 1 is reflected in the autonomous driving steering angle δb and the target state quantity ST calculated by the ADS control unit 190 being the driving entity. Therefore, the VSC control unit 170 calculates the counter steering angle δc based not on the steering wheel angle φs but on the target state quantity ST. As a result, it is possible to more accurately calculate the counter steering angle δc during the autonomous driving.

Moreover, according to the present embodiment, the EPS device 50 turns the front wheel 5F during the autonomous driving. When the EPS device 50 turns the front wheel 5F, the steering wheel 21 connected to the front wheel 5F also rotates in conjunction with the turning of the front wheel 5F. In this case, even when the VGRS device 30 operates, the steering angle of the front wheel 5F does not change, but merely a rotation angle of the steering wheel 21 changes. In view of the above, according to the present embodiment, the vehicle stabilization control during the autonomous driving is performed by the use of the EPS device 50 instead of the VGRS device 30. More specifically, in the turning control performed by the EPS control unit 150, the sum of the autonomous driving steering angle δb and the counter steering angle δc is used as the target steering angle δa (i.e. δa=δb+δc). As a result, the counter steering angle δc required for the vehicle stabilization control is reflected in the steering angle of the front wheel 5F. That is, the vehicle stabilization control is performed as expected.

It can be said that the present embodiment proposes a new control law suitable for the autonomous driving. Due to the new control law, the autonomous driving becomes more comfortable for the driver. This contributes to increase in the driver's trust in the autonomous driving system.

5. Modification Example

According to the present embodiment, as described above, the EPS device 50 turns the front wheel 5F during the autonomous driving. When the EPS device 50 turns the front wheel 5F, the steering wheel 21 connected to the front wheel 5F also rotates in conjunction with the turning of the front wheel 5F. Therefore, when the EPS device 50 rapidly turns the front wheel 5F, the steering wheel 21 also rotates rapidly. For example, there is a possibility that the automatic steering is performed rapidly in order to urgently avoid an obstacle in front of the vehicle 1 during the autonomous driving. In this case, the steering wheel 21 also rotates rapidly in conjunction with the rapid automatic steering. Such the rapid motion of the steering wheel 21 during the autonomous driving is not preferable from the following points of view.

First, let us consider a situation (Hands Off) where the driver's hands are off the steering wheel 21 during the autonomous driving. When there is an obstacle in front of the vehicle 1, for example, there is a possibility that not only the ADS control unit 190 but also the driver recognizes the obstacle. In this case, the driver feeling danger may try to override at the same time when the ADS control unit 190 performs the automatic steering. However, a typical condition for override is that the driver grasps the steering wheel 21. Therefore, if the steering wheel 21 rotates rapidly due to the automatic steering, it is hard for the driver to override. In other words, the rapid motion of the steering wheel 21 makes it difficult for the driver to override.

As another example, let us consider a situation (Hands On) where the driver is holding the steering wheel 21 during the autonomous driving. When the steering wheel 21 rotates rapidly in this situation, it is hard for the driver to keep holing the steering wheel 21. Or, it is dangerous if the driver's hands are forcibly moved by the motion of the steering wheel 21.

Figure 8:
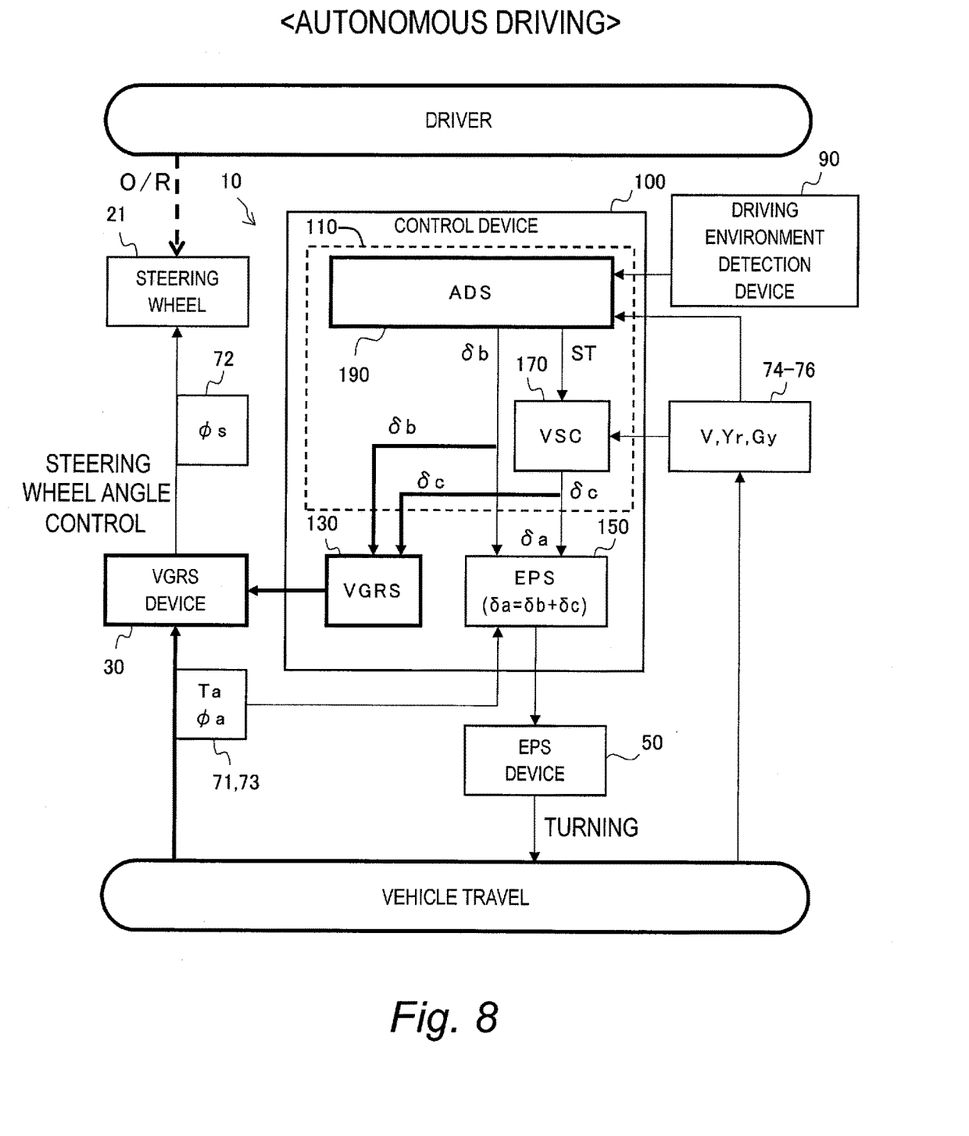
FIG. 8 is a conceptual diagram showing a modification example of control processing during autonomous driving according to the embodiment of the present disclosure.

In view of the above, a modification example of the present embodiment provides a technique that can make it easier for the driver to grasp the steering wheel 21 during the autonomous driving. FIG. 8 is a conceptual diagram indicating the modification example.

<Target Steering Angle Calculation Unit 110, ADS Control Unit 190, VSC Control Unit 170>

The target steering angle calculation unit 110 is the same as in the case shown in FIG. 4. That is, the target steering angle calculation unit 110 calculates the autonomous driving steering angle $\delta b$ required for the automatic steering and the counter steering angle $\delta c$ required for the vehicle stabilization control. The target steering angle $\delta a$ of the front wheel 5F is a sum of the autonomous driving steering angle $\delta b$ and the counter steering angle $\delta c$ (i.e. $\delta a = \delta b + \delta c$). The target steering angle calculation unit 110 outputs information indicating the target steering angle $\delta a$ not only to the EPS control unit 150 but also to the VGRS control unit 130.

Alternatively, the target steering angle calculation unit 110 may output information indicating both the autonomous driving steering angle $\delta b$ and the counter steering angle $\delta c$ to the EPS control unit 150 and the VGRS control unit 130. In this case, the target steering angle $\delta a$ is calculated in each of the EPS control unit 150 and the VGRS control unit 130.

<EPS Control Unit 150>

The EPS control unit 150 is the same as in the case shown in FIG. 4. That is, the EPS control unit 150 uses the EPS device 50 to perform the turning control based on the target steering angle $\delta a$.

<VGRS Control Unit 130>

The steering wheel 21 rotates in conjunction with the above-described turning control using the EPS device 50. That is, the steering wheel angle $\varphi s$ changes. According to the modification example of the present embodiment, "steering wheel angle control" for weakening such the change in the steering wheel angle $\varphi s$ caused by the turning control is performed along with the turning control. In the steering wheel angle control, the VGRS device 30 is used. In other words, the VGRS device 30, which is used for the "turning control" during the non-autonomous driving, is used for the "steering wheel angle control" during the autonomous driving.

More specifically, the VGRS control unit 130 receives the information indicating the target steering angle $\delta a$ of the front wheel 5F from the target steering angle calculation unit 110. Based on the target steering angle $\delta a$, the VGRS control unit 130 can recognize a direction of change in the steering wheel angle $\varphi s$ caused by the turning control. The VGRS control unit 130 actuates the VGRS device 30 in a direction to suppress (weaken, reduce) the change in the steering wheel angle $\varphi s$ caused by the turning control. That is, the VGRS control unit 130 controls the VGRS driver 35 such that the electric motor 31 rotates in a direction to suppress the change in the steering wheel angle $\varphi s$.

The direction of change in the steering wheel angle $\varphi s$ by the steering wheel angle control is opposite to the direction of change in the steering wheel angle $\varphi s$ caused by the turning control. That is, the direction of change in the steering wheel angle $\varphi s$ by the steering wheel angle control is a direction to counteract the change in the steering wheel angle $\varphi s$ caused by the turning control. Therefore, a speed of change in the steering wheel angle $\varphi s$ when the steering wheel angle control is performed along with the turning control becomes lower than that when the steering wheel angle control is not performed. That is, the rapid motion of the steering wheel 21 during the autonomous driving is suppressed. As a result, it becomes easier for the driver to grasp the steering wheel 21. That is, it becomes easier for the driver to override. Moreover, the risk that the driver's hands are forcibly moved by the motion of the steering wheel 21 is reduced.

For a more detailed explanation, a change amount (absolute value) of the steering wheel angle $\varphi s$ caused by the turning control is hereinafter referred to as a "predicted change amount $\theta p$". The predicted change amount $\theta p$ can be predicted from the target steering angle $\delta a$. On the other hand, a change amount (absolute value) of the steering wheel angle $\varphi s$, that is, a rotation amount (absolute value) of the electric motor 31 by the steering wheel angle control is hereinafter referred to as a "counter change amount $\theta c$". The counter change amount $\theta c$ is determined to satisfy a condition "$\theta c \leq \theta p$", for example.

For example, the VGRS control unit 130 has a steering wheel angle control map indicating a relationship between the target steering angle $\delta a$ and the counter change amount $\theta c$. The VGRS control unit 130 acquires the counter change amount $\theta c$ based on the target steering angle $\delta a$ and the steering wheel angle control map. Then, the VGRS control unit 130 outputs a control signal corresponding to the counter change amount $\theta c$ to the VGRS driver 35. The VGRS driver 35 drives (actuates) the electric motor 31 in accordance with the control signal from the VGRS control unit 130.

When the counter change amount $\theta c$ is equal to the predicted change amount $\theta p$ (i.e. $\theta c = \theta p$), the steering wheel 21 hardly rotates. When the counter change amount $\theta c$ is less than the predicted change amount $\theta p$ (i.e. $\theta c < \theta p$), the steering wheel 21 rotates a little. When the steering wheel 21 moves, the driver can recognize that the autonomous driving system operates normally and thus achieve a sense of security.

The steering wheel angle control may be performed when the predicted change amount θp exceeds an allowable value. In this case, the counter change amount θc is determined to satisfy a condition "θp−θc≤allowable value", for example. By performing the steering wheel angle control with such the counter change amount θc, it is possible to suppress the change in the steering wheel angle φs below a certain level.

It should be noted that at least the effects can be obtained by rotating the electric motor 31 in a direction to suppress the change in the steering wheel angle φs caused by the turning control. The effects can be obtained even when feedforward control based on the steering wheel angle control map is performed as described above.

Alternatively, feedback control using the detected information of the steering wheel angle φs and the rotation angle φa may be performed in the steering wheel angle control. For example, the steering wheel angle control may be performed such that the steering wheel angle φs does not change. As another example, the steering wheel angle control may be performed such that a change amount of the steering wheel angle φs is kept below a threshold value. As still another example, the steering wheel angle control may be performed such that a change rate of the steering wheel angle φs is kept below a threshold value. A combination of the feedforward control and the feedback control also is possible. The steering wheel angle control according to the modification example of the present embodiment can be anything as long as it can rotate the electric motor 31 in a direction to suppress the change in the steering wheel angle φs caused by the turning control.

What is claimed is:

1. A vehicle travel control device comprising:
   an electric power steering device turning a wheel of a vehicle; and
   a control device performing autonomous driving control that controls autonomous driving of the vehicle, wherein
   the autonomous driving control comprises:
   target steering angle calculation processing that calculates a target steering angle of the wheel; and
   turning control that actuates the electric power steering device to turn the wheel such that a steering angle of the wheel becomes the target steering angle, wherein
   the target steering angle calculation processing comprises:
   first processing that calculates an autonomous driving steering angle and a target state quantity required for automatic steering in the autonomous driving;
   second processing that calculates a counter steering angle required for vehicle stabilization control, based on the target state quantity without using a steering wheel angle; and
   third processing that calculates a sum of the autonomous driving steering angle and the counter steering angle as the target steering angle.

2. An autonomous driving control method for controlling autonomous driving of a vehicle,
   the vehicle comprising an electric power steering device turning a wheel of the vehicle,
   the autonomous driving control method comprising:
   calculating a target steering angle of the wheel; and
   actuating the electric power steering device to turn the wheel such that a steering angle of the wheel becomes the target steering angle, wherein
   the calculating the target steering angle comprises:
   calculating an autonomous driving steering angle and a target state quantity required for automatic steering in the autonomous driving;
   calculating a counter steering angle required for vehicle stabilization control, based on the target state quantity without using a steering wheel angle; and
   calculating a sum of the autonomous driving steering angle and the counter steering angle as the target steering angle.

3. A vehicle travel control device comprising:
   an electric power steering device turning a wheel of a vehicle; and
   a control device performing autonomous driving control that controls autonomous driving of the vehicle,
   wherein in the autonomous driving control, the control device is configured to:
   calculate an autonomous driving steering angle and a target state quantity required for automatic steering in the autonomous driving;
   calculate a counter steering angle required for vehicle stabilization control, based on the target state quantity without using a steering wheel angle;
   calculate a sum of the autonomous driving steering angle and the counter steering angle as a target steering angle of the wheel; and
   actuate the electric power steering device to turn the wheel such that a steering angle of the wheel becomes the target steering angle.

* * * * *